US012638616B2

(12) United States Patent
Chen et al.

(10) Patent No.: US 12,638,616 B2
(45) Date of Patent: May 26, 2026

(54) ELECTRONIC DEVICE

(71) Applicants: Innolux Corporation, Miaoli County (TW); CARUX TECHNOLOGY PTE. LTD., Singapore (SG)

(72) Inventors: Kuan-Chen Chen, Tainan (TW); Liang-Cheng Ma, Miaoli County (TW); Ming-Er Fan, Miaoli County (TW)

(73) Assignees: Innolux Corporation, Miaoli County (TW); CARUX TECHNOLOGY PTE. LTD., Singapore (SG)

( * ) Notice: Subject to any disclaimer, the term of this patent is extended or adjusted under 35 U.S.C. 154(b) by 347 days.

(21) Appl. No.: 18/471,314

(22) Filed: Sep. 21, 2023

(65) Prior Publication Data

US 2024/0142669 A1     May 2, 2024

Related U.S. Application Data

(60) Provisional application No. 63/419,724, filed on Oct. 27, 2022.

(30) Foreign Application Priority Data

Jun. 9, 2023     (CN) .......................... 202310683703.8

(51) Int. Cl.
G02B 1/115     (2015.01)

(52) U.S. Cl.
CPC ................................... G02B 1/115 (2013.01)

(58) Field of Classification Search
CPC ......... B32B 7/023; B32B 17/10; B32B 17/08; B32B 17/10137; B32B 2457/20; H10K 59/80; H10K 59/12; H10K 59/8791; H10K 50/10; H10K 50/86; H10H 20/855; H10H 29/14; H10H 29/142; H01L 25/075; G09F 9/30
USPC ....... 359/601, 580, 581, 586, 587, 599, 604, 359/605, 609
See application file for complete search history.

(56) References Cited

U.S. PATENT DOCUMENTS

| | | | | |
|---|---|---|---|---|
| 2010/0177397 A1* | 7/2010 | Kamiyama | .............. | H01J 11/44 359/609 |
| 2011/0033681 A1* | 2/2011 | Adachi | .................. | G02B 1/115 428/212 |
| 2018/0038995 A1* | 2/2018 | Fujii | ........................ | B32B 7/02 |

FOREIGN PATENT DOCUMENTS

| | | |
|---|---|---|
| CN | 110054418 | 7/2019 |
| TW | 202136054 | 10/2021 |

OTHER PUBLICATIONS

"Office Action of Taiwan Counterpart Application", issued on Dec. 29, 2023, p. 1-p. 6.

* cited by examiner

*Primary Examiner* — Jie Lei
(74) *Attorney, Agent, or Firm* — JCIPRNET

(57)     ABSTRACT

An electronic device including a protective substrate is provided. The protective substrate includes a substrate and an anti-reflection layer. The anti-reflection layer is disposed on the substrate. The anti-reflection layer includes a first sublayer to an nth sublayer sequentially arranged on the substrate, where n is greater than 1, and a product range of a thickness and a refractive index of the nth sublayer ranges from 100 nm to 170 nm.

10 Claims, 11 Drawing Sheets

| Optical path length (nm) of an nth sublayer of an anti-reflection layer | Color shift phenomenon generated in an electronic device (the anti-reflection layer includes 1~5 sublayers) | Color shift phenomenon generated in an electronic device (the anti-reflection layer includes 6~12 sublayers) |
|:---:|:---:|:---:|
| 190 | × | × |
| 180 | × | × |
| 170 | × | △ |
| 160 | × | △ |
| 150 | × | ○ |
| 140 | △ | ○ |
| 130 | ○ | ○ |
| 120 | ○ | ○ |
| 110 | × | △ |
| 100 | × | △ |
| 90 | × | × |

FIG. 2

| Each sublayer of an anti-reflection layer | First embodiment | | | Second embodiment | | | Third embodiment | | | Fourth embodiment | | |
|---|---|---|---|---|---|---|---|---|---|---|---|---|
| | Thickness (nm) | Refractive index | Optical path length (nm) | Thickness (nm) | Refractive index | Optical path length (nm) | Thickness (nm) | Refractive index | Optical path length (nm) | Thickness (nm) | Refractive index | Optical path length (nm) |
| The sixth sublayer | 95-106 | 1.43-1.53 | 135.85-162.18 | 86-96 | 1.43-1.53 | 122.98-146.88 | 92-103 | 1.43-1.53 | 131.56-157.59 | 84-94 | 1.43-1.53 | 120.12-143.82 |
| The fifth sublayer | 28-32 | 2.26-2.41 | 63.28-77.12 | 39-44 | 2.32-2.47 | 90.48-108.68 | 34-39 | 2.32-2.47 | 78.88-96.33 | 40-46 | 2.26-2.41 | 90.4-110.86 |
| The fourth sublayer | 30-34 | 1.43-1.53 | 42.9-52.02 | 10-12 | 1.43-1.53 | 14.3-18.36 | 15-18 | 1.43-1.53 | 21.45-27.54 | 11-13 | 1.43-1.53 | 15.73-19.89 |
| The third sublayer | 29-33 | 2.26-2.41 | 65.54-79.53 | 50-56 | 2.32-2.47 | 116-138.32 | 38-42 | 2.32-2.47 | 88.16-103.74 | 44-50 | 2.26-2.41 | 99.44-120.5 |
| The second sublayer | 46-52 | 1.43-1.53 | 65.78-79.56 | 33-37 | 1.43-1.53 | 47.19-56.61 | 37-42 | 1.43-1.53 | 52.91-64.26 | 35-39 | 1.43-1.53 | 50.05-59.67 |
| The first sublayer | 9-11 | 2.26-2.41 | 20.34-26.51 | 14-16 | 2.32-2.47 | 32.48-39.52 | 10-13 | 2.32-2.47 | 23.2-32.11 | 11-13 | 2.26-2.41 | 24.86-31.33 |

FIG. 3

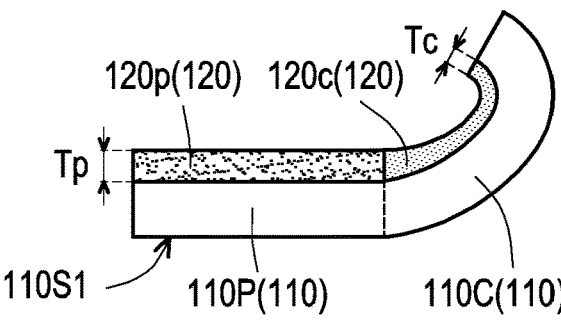
FIG. 4A
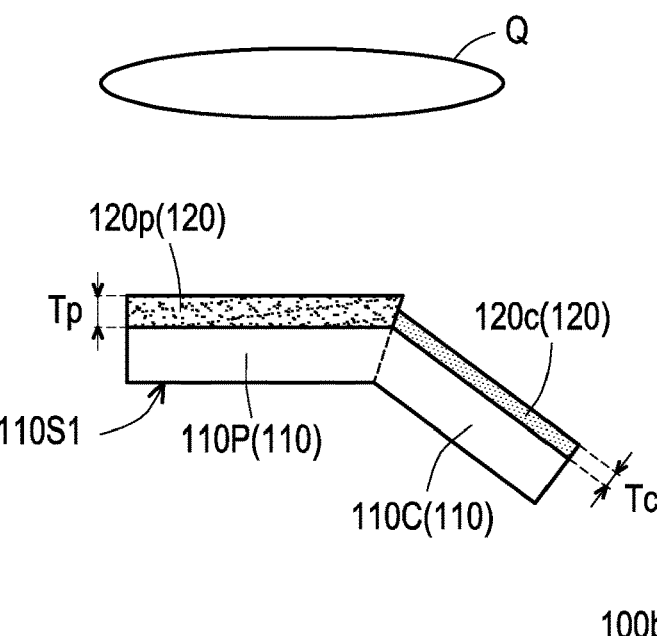
FIG. 4B

| Decrease range of a thickness of an anti-reflection layer | Color shift phenomenon generated in an electronic device (the anti-reflection layer includes 1~5 sublayers) | Color shift phenomenon generated in an electronic device (the anti-reflection layer includes 6~12 sublayers) |
|---|---|---|
| 15% | × | × |
| 14% | × | × |
| 13% | × | △ |
| 12% | × | △ |
| 11% | × | △ |
| 10% | × | △ |
| 9% | × | △ |
| 8% | × | △ |
| 7% | × | ○ |
| 6% | × | ○ |
| 5% | △ | ○ |
| 4% | △ | ○ |
| 3% | △ | ○ |
| 2% | ○ | ○ |
| 1% | ○ | ○ |

FIG. 5

| Increase range of a thickness of an anti-reflection layer | Color shift phenomenon generated in an electronic device (the anti-reflection layer includes 1~5 sublayers) | Color shift phenomenon generated in an electronic device (the anti-reflection layer includes 6~12 sublayers) |
|---|---|---|
| 10% | × | × |
| 9% | × | × |
| 8% | × | × |
| 7% | × | △ |
| 6% | × | ○ |
| 5% | × | ○ |
| 4% | △ | ○ |
| 3% | △ | ○ |
| 2% | ○ | ○ |
| 1% | ○ | ○ |

FIG. 7

ELECTRONIC DEVICE

CROSS-REFERENCE TO RELATED APPLICATION

This application claims the priority benefit of U.S. provisional application Ser. No. 63/419,724, filed on Oct. 27, 2022, and China application Ser. No. 202310683703.8, filed on Jun. 9, 2023. The entirety of each of the above-mentioned patent applications is hereby incorporated by reference herein and made a part of this specification.

BACKGROUND

Technical Field

The disclosure relates to an electronic device having an anti-reflection layer.

Description of Related Art

When a substrate of an electronic device includes inflection surfaces or curved surfaces, subsequent formation of an anti-reflection film on the substrate may yield varying film thicknesses across different areas, including flat areas and inflection areas, for instance. If there is a notable difference in the film thicknesses, it may potentially manifest as color shift phenomena within the electronic device.

SUMMARY

According to an embodiment of the disclosure, an electronic device including a protective substrate is provided. The protective substrate includes a substrate and an anti-reflection layer. The anti-reflection layer is disposed on the substrate. The anti-reflection layer includes a first sublayer to an nth sublayer sequentially arranged on the substrate, where n is greater than 1, and a product range of a thickness and a refractive index of the nth sublayer ranges from 100 nm to 170 nm.

In order for the features and advantages of the disclosure to be more comprehensible, the following specific embodiments are described in detail in conjunction with the drawings.

BRIEF DESCRIPTION OF THE DRAWINGS

The accompanying drawings, which are included to provide a further understanding of the disclosure, are incorporated in and constitute a part of this specification. The drawings illustrate embodiments of the disclosure and, together with the description, serve to explain the principles of the disclosure.

FIG. 2 illustrates a relationship between an optical path length of an nth sublayer of an anti-reflection layer in an electronic device and a color shift phenomenon generated in the electronic device according to an embodiment of the disclosure.

FIG. 3 illustrates a thickness, a refractive index, and an optical path length of each sublayer of an anti-reflection layer in an electronic device according to four embodiments of the disclosure.

FIG. 4A to FIG. 4F are schematic cross-sectional views respectively illustrating a portion of a protective substrate in an electronic device according to six embodiments of the disclosure, where a thickness of an anti-reflection layer in an inflection area is less than a thickness of the anti-reflection layer in a flat area.

FIG. 5 illustrates a relationship between a decrease range of the thickness of the anti-reflection layer in the electronic device respectively shown in FIG. 4A to FIG. 4F and the color shift phenomenon respectively generated in the electronic device.

FIG. 7 illustrates a relationship between an increase range of the thickness of the anti-reflection layer in the electronic device respectively shown in FIG. 6A to FIG. 6E and the color shift phenomenon respectively generated in the electronic device.

DETAILED DESCRIPTION OF DISCLOSED EMBODIMENTS

Figure 1:
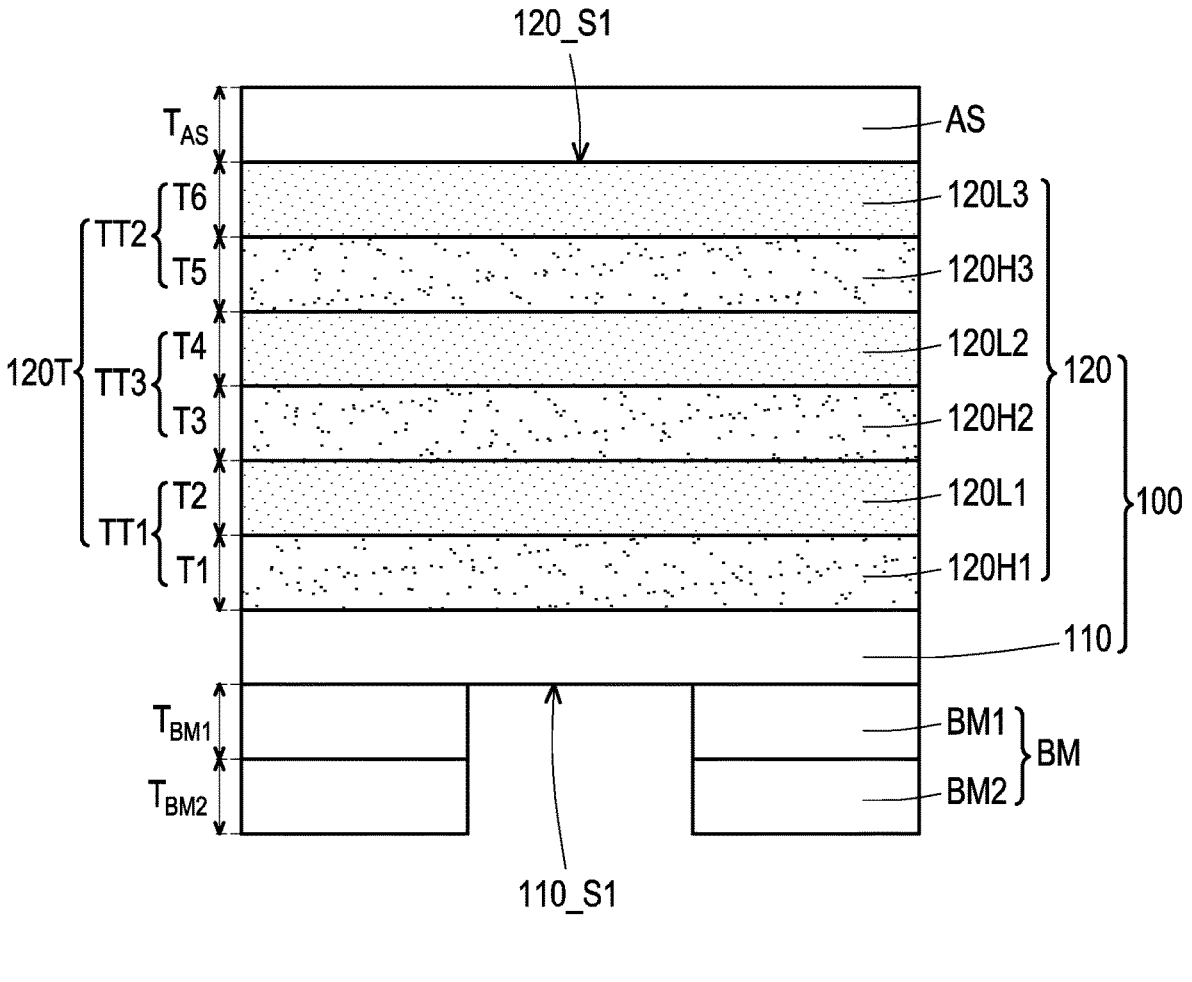
FIG. 1 is a schematic cross-sectional view illustrating an electronic device according to an embodiment of the disclosure.

Reference will now be made in detail to the exemplary embodiments of the disclosure, and examples of the exemplary embodiments are illustrated in the accompanying drawings. Whenever possible, the same reference numbers are used in the drawings and descriptions to indicate the same or similar parts.

The disclosure may be understood with reference to the following detailed description with the drawings. Note that for clarity of description and ease of understanding, the drawings of the disclosure show a part of an electronic device, and certain elements in the drawings may not be drawn to scale. In addition, the number and size of each device shown in the drawings simply serve for exemplifying instead of limiting the scope of the disclosure.

Certain terminologies are used throughout the description and the appended claims to refer to specific elements. As to be understood by those skilled in the art, electronic device manufacturers may refer to an element by different names. Herein, it is not intended to distinguish between elements that have different names instead of different functions. In the following description and claims, terminologies such as "include," "comprise," and "have" are used in an open-ended manner, and thus should be interpreted as "including, but not limited to". Therefore, the terminologies "include," "comprise," and/or "have" used in the description of the disclosure denote the presence of corresponding features, areas, steps, operations, and/or elements but are not limited to the presence of one or more corresponding features, areas, steps, operations, and/or elements.

In this disclosure, directional terminologies, such as "top," "bottom," "front," "back," and so on, are used with reference to the orientation of the accompanying drawings. As such, the directional terminologies are used for purposes of illustration and are in no way limiting. In the accompanying drawings, each drawing shows the general features of the methods, structures and/or materials adopted in a specific embodiment. However, the drawings should not be construed as defining or limiting the scope or nature covered by the embodiments. For instance, for clarity, the relative size, thickness, and position of each layer, area, and/or structure may be reduced or enlarged.

When a corresponding element (such as a film layer or an area) is referred to as being "on another element," the element may be directly on the other element or there may be another element between the two. On the other hand, when an element is referred to as being "directly on another element," there is no element between the two. Also, when an element is referred to as being "on another element," the two have a top-down relationship in the top view direction, and the element may be above or below the other element, and the top-down relationship depends on the orientation of the device.

The terminology "equal to," "equivalent," "substantially," or "approximately" is generally interpreted as being within 20% of a given value or range, or interpreted as being within 10%, 5%, 3%, 2%, 1%, or 0.5% of a given value or range.

Although terminologies such as first, second, and third may be used to describe different diverse elements, such elements are not limited by the terminologies. The terminologies are used simply to discriminate one constituent element from other elements in the description. In the claims, the terminologies first, second, third, and so on may be used in accordance with the order of claiming elements instead of using the same terminologies. Accordingly, a first constituent element in the following description may be a second constituent element in the claims.

Note that in the following embodiments, the technical features provided in several different embodiments may be replaced, reorganized, and mixed without departing from the spirit of the disclosure so as to complete other embodiments. The technical features of the embodiments may be mixed and matched arbitrarily as long as they do not violate the spirit of the disclosure or conflict with each other.

The electrical connection or coupling described in this disclosure may refer to direct connection or indirect connection. In the case of direct connection, the endpoints of the elements on the two circuits are directly connected or are connected to each other by a conductor segment. In the case of indirect connection, between the end points of the elements on the two circuits there are switches, diodes, capacitors, inductances, other suitable components, or a combination of the above-mentioned elements, which should however not be construed as a limitation in the disclosure.

In this disclosure, measurement of length, width, thickness, height, width, and area may be done by applying an optical microscope (OM), and the thickness may be measured by obtaining a cross-sectional image of a to-be-measured element through applying a scanning electron microscope (SEM), which should however not be construed as a limitation in the disclosure. In addition, certain errors between any two values or directions for comparison may be acceptable. If a first value is equal to a second value, it indicates that a margin of error of about 10% may exist between the first and second values. If a first direction is perpendicular to a second direction, an angle difference between the first direction and the second direction may be between 80 degrees and 100 degrees; if the first direction is parallel to the second direction, an angle difference between the first direction and the second direction may be between 0 degrees and 10 degrees.

The display device provided in the disclosure may be a non-self-luminous display device or a self-luminous display device. The display device may, for instance, include diodes, liquid crystal, light emitting diodes (LED), quantum dots (QD), fluorescence, phosphor, other appropriate display media, or a combination thereof. The LED may include, for instance, an organic light emitting diode (OLED), a mini LED, a micro LED, an OLED, or a QDLED, which should however not be construed as a limitation in the disclosure. Note that the electronic device may be any arrangement and combination of the foregoing, which should however not be construed as a limitation in the disclosure. In addition, the appearance of the electronic device may be rectangular, circular, polygonal, in a shape with curved edges, or in other suitable shapes. The electronic device may have peripheral systems, such as a driving system, a control system, a light source system, and the like.

FIG. 1 is a schematic cross-sectional view illustrating an electronic device according to an embodiment of the disclosure.

With reference to FIG. 1, an electronic device 10 provided in this embodiment is shown. The electronic device 10 provided in this embodiment may be, for instance, applied to digital galleries, mobile phones, tablet computers, public information displays, and/or other electronic devices that may be used outdoors or in an environment with high-intensity ambient light, which should however not be construed as a limitation in the disclosure.

In some embodiments, the electronic device 10 may be a display device, which includes a display panel (not shown). The display panel may include a liquid crystal display (LCD) panel, an OLED display panel, a micro LED display panel, a reflective display panel, or any other appropriate display panel, which should however not be construed as a limitation in the disclosure.

For instance, the display panel may include a substrate (not shown), an element layer (not shown), and a display medium (not shown). The substrate of the display panel may include, for instance, a flexible substrate or a non-flexible substrate, where a material of the substrate may include glass, plastic, or a combination thereof. The element layer of the display panel may be arranged on the substrate and may include, for instance, a circuit structure for driving the display medium. For instance, the element layer of the display panel may include a plurality of scan lines, a plurality of data lines, an insulating layer, a capacitor, a plurality of transistors, and/or a plurality of electrodes, which should however not be construed as a limitation in the disclosure. In some embodiments, the element layer of the display panel may include a plurality of lines but exclude the transistors. The display medium of the display panel may be disposed on the element layer, for instance. In some embodiments, the display medium of the display panel may include a plurality of light-emitting elements, which may emit various suitable color light (such as red, green, blue, white, and so on) or UV light, which should however not be construed as a limitation in the disclosure. For instance, the display medium of the display panel may include self-luminous materials, which may include diodes, OLEDs, inorganic LEDs (e.g., mini LEDs or micro LEDs), QDs, QLEDs, QDLEDs, fluorescence, phosphor, other appropriate materials, or a combination of the above materials, which should however not be construed as a limitation in the disclosure. In other embodiments, the display medium of the display panel may include non-self-luminous materials, which may include liquid crystal molecules, electrophoretic display media, or other appropriate display media, where the liquid crystal molecules may be rotatable or switchable by a vertical electric field or a lateral electric field, which should however not be construed as a limitation in the disclosure.

In this embodiment, the electronic device 10 includes a protective substrate 100, which includes a substrate 110 and an anti-reflection layer 120.

The anti-reflection layer 120, for instance, is formed or disposed on a side of the substrate 110 adjacent to a viewer. In other embodiments, other functional layers (not shown) may be formed or disposed on the substrate 110 or the anti-reflection layer 120, and the functional layers may include but should not be limited to an anti-smudge layer and an anti-glare layer. The substrate 110 may include, for instance, a flexible substrate or a non-flexible substrate, and a material of the substrate 110 may include glass, ceramics, plastics, or a combination thereof. The material of the substrate 110 may include quartz, sapphire, polymethyl methacrylate (PMMA), polycarbonate (PC), polyimide (PI), polyethylene terephthalate (PET), other appropriate materials, or a combination of the aforementioned materials, which should however not be construed as a limitation in the disclosure. In some embodiments, the substrate 110 may have a flat area and an inflection area (a non-flat area) or a bent area, which will be described in detail in the following embodiments. In some embodiments, the substrate 110 may have bendability.

In some embodiments, the anti-reflection layer 120 may be, for instance, disposed on the substrate 110. The anti-reflection layer 120 may serve to reduce reflectivity of ambient light from the surroundings, thereby improving the quality of images displayed by the electronic device 10.

In some embodiments, the anti-reflection layer 120 includes a first sublayer to an nth sublayer sequentially arranged on the substrate 110, where n is greater than 1. In some embodiments, n is greater than or equal to 2. In some embodiments, n is greater than or equal to 4. In some embodiments, n is greater than or equal to 6. That is, the anti-reflection layer 120 may include, for instance, composite sublayers, where the nth sublayer may be the sublayer farthest away from the substrate 110 in the anti-reflection layer 120, or the nth sublayer may be the sublayer which the ambient light enters first, i.e., the nth sublayer may be the sublayer adjacent to the viewer. In some embodiments, the first sublayer to the nth sublayer of the anti-reflection layer 120 are sequentially stacked high-reflective-index sublayers 120H and low-reflective-index sublayers 120L, where n being an even number, and the adjacent high-reflective-index sublayer 120H and low-reflective-index sublayer 120L may be considered as a single sublayer unit. As shown in FIG. 1, the anti-reflection layer 120 may include, for instance, six high-reflective-index sublayers 120H and low-reflective-index sublayers 120L that are alternately arranged, which should however not be construed as a limitation in the disclosure; each of the sublayers 120H and 120L includes a first high-reflective-index sublayer 120H1, a first low-reflective-index sublayer 120L1, a second high-reflective-index sublayer 120H2, a second low-reflective-index sublayer 120L2, a third high-reflective-index sublayer 120H3, and a third low-reflective-index sublayer 120L3, which should however not be construed as a limitation in the disclosure. In other embodiments (not shown), the anti-reflection layer 120 may optionally have more or fewer sublayers. The high-reflective-index sublayers 120H and/or the low-reflective-index sublayers 120L may be formed, for instance, through performing a physical vapor deposition (PVD) process, which includes but is not limited to evaporation, ion plating, sputtering plating, or other suitable methods.

In some embodiments, a method of forming the high-reflective-index sublayers 120H and a method of forming the low-reflective-index sublayers 120L may be the same or different. In some embodiments, the high-reflective-index sublayers 120H include a material with a refractive index of 1.9 or more (including 1.9) under visible light irradiation. For instance, the material of the high-reflective-index sublayers 120H may include $Nb_2O_5$, $Si_3N_4$, other appropriate oxides, or a combination thereof, and the appropriate oxides may include but are not limited to $TiO_2$, $ZrO_2$, and ($Ta_2O_5$. In some embodiments, the low-reflective-index sublayers 120L include a material with a refractive index of 1.6 or less (including 1.6) under visible light irradiation. For instance, the material of the low-reflective-index sublayers 120L may include $SiO_2$ or other appropriate materials, which should however not be construed as a limitation in the disclosure. In other embodiments, any of the high-reflective-index sublayers may include a single-layer material or a composite-layer material, and in case of the composite-layer material, a refractive index of the high-reflective-index sublayer may be, for instance, an average refractive index of the different composite-layer materials. In other embodiments, any of the low-reflective-index sublayers may include a single-layer material or a composite-layer material, and in case of the composite-layer material, a refractive index of the low-reflective-index sublayer may be, for instance, an average refractive index of the different composite-layer materials.

In some embodiments, a total thickness 120T of the anti-reflection layer 120 may range from 40 nm to 1200 nm (40 nm≤120T≤1200 nm), which should however not be construed as a limitation in the disclosure, and the total thickness 120T may be adjusted according to actual requirements. In this embodiment, a thickness of the nth sublayer of the anti-reflection layer 120 ranges from 70 nm to 120 nm (70 nm≤the thickness≤120 nm). In the embodiment shown in FIG. 1, n is 6; namely, the third low-reflective-index sublayer 120L3, which is the farthest away from the substrate 110, is the sixth sublayer of the anti-reflection layer 120a, and a thickness T6 of the sixth sublayer ranges from 70 nm to 120 nm (70 nm≤T6≤120 nm). In addition, the first high-reflective-index sublayer 120H1, the first low-reflective-index sublayer 120L1, the second high-reflective-index sublayer 120H2, the second low-reflective-index sublayer 120L2, and the third high-reflective-index sublayer 120H3 shown in FIG. 1 are respectively the first sublayer, the second sublayer, the third sublayer, the fourth sublayer, and the fifth sublayer of the anti-reflection layer 120, where a thickness T1 of the first sublayer ranges from 10 nm to 50 nm (10 nm≤T1≤50 nm), a thickness T2 of the second sublayer ranges from 10 nm to 50 nm (10 nm≤T2≤50 nm), a thickness T3 of the third sublayer ranges from 10 nm to 120 nm (10 nm≤T3≤120 nm), a thickness T4 of the fourth sublayer ranges from 10 nm to 120 nm (10 nm≤T4≤120 nm), and a thickness T5 of the fifth sublayer ranges from 10 nm to 120 nm (10 nm≤T5≤120 nm), which should however not be construed as a limitation in the disclosure. The thickness of each sublayer of the anti-reflection layer 120 may be observed by applying a transmission electron microscope (TEM) and measured by applying an ellipsometer, which should however not be construed as a limitation in the disclosure, and other instruments for measuring the thickness or the refractive index may also be used.

In this embodiment, the sum of the thickness of the first sublayer and the thickness of the second sublayer is defined as a first total thickness, and the sum of the thickness of the (n−1)th sublayer and the thickness of the nth sublayer is defined as a second total thickness. In the embodiment shown in FIG. 1, n is 6 or greater than 6, the first sublayer and the second sublayer may be defined as a first sublayer unit, and the sum of the thickness T1 of the first sublayer and the thickness T2 of the second sublayer is the first total thickness TT1, which may range from 20 nm to 100 nm (20 nm≤TT1≤100 nm), or 30 nm to 90 nm (30 nm≤TT1≤90 nm), which should however not be construed as a limitation in the disclosure. The fifth sublayer and the sixth sublayer may be defined as a second sublayer unit, and the sum of the thickness T5 of the fifth sublayer and the thickness T6 of the sixth sublayer is the second total thickness TT2, which may range from 80 nm to 240 nm (80 nm≤TT2≤240 nm), 90 nm to 230 nm (90 nm≤TT2≤230 nm) or 100 nm to 200 nm (100 nm≤TT2≤200 nm), which should however not be construed as a limitation in the disclosure. In this embodiment, the first total thickness TT1 is, for instance, less than the second total thickness TT2, where the difference between the second total thickness TT2 and the first total thickness TT1 may range from 20 nm to 220 nm (20 nm≤TT2−TT1≤220 nm), which should however not be construed as a limitation in the disclosure. In an embodiment, the difference between the second total thickness TT2 and the first total thickness TT1 may range from 20 nm to 220 nm (20 nm≤TT2−TT1≤220 nm), 40 nm to 200 nm (40 nm≤TT2−TT1≤200 nm), 60 nm to 180 nm (60 nm≤TT2−TT1≤180 nm), or 60 nm to 160 nm (60 nm≤TT2−TT1≤160 nm), which should however not be construed as a limitation in the disclosure. Besides, the third sublayer and the fourth sublayer may be defined as a third sublayer unit, the sum of the thickness T3 of the third sublayer and the thickness T4 of the fourth sublayer is a third total thickness TT3, which may range from 20 nm to 240 nm (20 nm≤TT3≤240 nm), 30 nm to 230 nm (30 nm≤TT3≤230 nm), or 40 nm to 220 nm (40 nm≤TT3≤220 nm), which should however not be construed as a limitation in the disclosure. In this embodiment, the third total thickness TT3 is greater than the first total thickness TT1, where the difference between the third total thickness TT3 and the first total thickness TT1 may range from 20 nm to 220 nm (20 nm≤TT3−TT1≤220 nm), 30 nm to 210 nm (30 nm≤TT3−TT1≤210 nm), 40 nm to 200 nm (40 nm≤TT3−TT1≤200 nm), or 60 nm to 180 nm (60 nm≤TT3−TT1≤180 nm), which should however not be construed as a limitation in the disclosure. In this embodiment, the third total thickness TT3 is less than the second total thickness TT2, where the difference between the third total thickness TT3 and the second total thickness TT2 may range from 20 nm to 150 nm (20 nm≤TT2−TT3≤150 nm), which should however not be construed as a limitation in the disclosure. In an embodiment, the difference between the third total thickness TT3 and the second total thickness TT2 may range from 50 nm to 190 nm (50 nm≤TT2−TT3≤190 nm), 60 nm to 180 nm (60 nm≤TT2−TT3≤180 nm), or 70 nm to 170 nm (70 nm≤TT2−TT3≤170 nm), which should however not be construed as a limitation in the disclosure. The high-reflective-index sublayer 120H and the low-reflective-index sublayer 120L of the anti-reflection layer 120 may be defined as one sublayer unit, the thickness of each of the sublayer units in the anti-reflection layer 120 may, for instance, increase as the sublayer units are farther away from the substrate 110, and the thicknesses may increase proportionally or non-proportionally as the sublayer units are farther away from the substrate 110, which should however not be construed as a limitation in the disclosure.

In the case where the anti-reflection layer 120 includes more than 6 sublayers, note that the third total thickness TT3 may, for instance, be the average thickness of the sublayer units excluding the first sublayer unit TT1 and the second sublayer unit TT2.

With reference to FIG. 1, in some embodiments, the electronic device 10 may further include an anti-smudge layer AS. The anti-smudge layer AS may, for instance, be arranged on a surface 120_S1 of the anti-reflection layer 120 away from the substrate 110, and the anti-smudge layer AS may be configured to reduce the impact of pollution from the external environment. The anti-smudge layer AS may achieve dustproof effects, scratch-resistant effects, moisture-proof effects, and the like to mitigate the influence of the external environment on the internal elements of the electronic device 10, and the anti-smudge layer AS may have light transmittance, which should however not be construed as a limitation in the disclosure. In some embodiments, a thickness $T_{AS}$ of the anti-smudge layer AS may range from 3 nm to 8 nm (3 nm≤$T_{AS}$≤8 nm), 4 nm to 7 nm (4 nm≤$T_{AS}$≤7 nm), or 4 nm to 6 nm (4 nm≤$T_{AS}$≤6 nm), which should however not be construed as a limitation in the disclosure.

As shown in FIG. 1, in some embodiments, the electronic device 10 may further include a decoration layer BM. For instance, the decoration layer BM may be disposed on a surface 110_S1 of the substrate 110 which is far from the anti-reflection layer 120, or the decoration layer BM may be disposed between the protective substrate 100 and the display panel (not shown), which should however not be construed as a limitation in the disclosure. The decoration layer BM may be configured to shield traces, electronic elements, or other components disposed in a peripheral area of a display panel, which should however not be construed as a limitation in the disclosure. In this embodiment, the decoration layer BM may include at least one sublayer, for instance, two sublayers (a sublayer BM1 and a sublayer BM2), which may be color resistors of different colors or sublayers with different light shielding rates, which should however not be construed as a limitation in the disclosure. The decoration layer BM may optionally have more or fewer sublayers. In some embodiments, a thickness $T_{BM1}$ and a thickness $T_{BM2}$ of the decoration sublayers BM1 and BM2 may range from 4 nm to 20 nm (4 nm≤$T_{BM1}$≤20 nm; 4 nm≤$T_{BM2}$≤20 nm) or 6 nm to 18 nm (6 nm≤$T_{BM1}$≤18 nm; 6 nm≤$T_{BM2}$≤18 nm), which should however not be construed as a limitation in the disclosure. In some embodiments, the decoration layer BM may be designed to have a ring shape, for instance, and the decoration layer BM may be disposed along an edge of the substrate 110. In some embodiments, in a top view direction of the electronic device, the decoration layer BM may not overlap or partially overlap the display area (not shown) of the panel (not shown).

In some embodiments, the electronic device 10 may further include an anti-glare layer (not shown). The anti-glare layer may be disposed between the substrate 110 and the anti-reflection layer 120, which should however not be construed as a limitation in the disclosure. In other embodiments, a surface treatment process (such as an etching process) may be performed on the substrate 110 to equip the substrate with functions of the anti-glare layer. The anti-glare layer may be configured, for instance, to increase diffusion of ambient light from the surroundings and/or reduce direct reflection of the ambient light from the surroundings, thereby providing anti-glare properties and enhancing the comfort of users of the electronic device 10.

FIG. 2 illustrates a relationship between an optical path length of an nth sublayer of an anti-reflection layer in an electronic device and a color shift phenomenon generated in the electronic device according to an embodiment of the disclosure.

In some embodiments, a product range of a thickness and a refractive index of the nth sublayer of the anti-reflection layer 120 ranges from 100 nm to 170 nm (100 nm≤the thickness×the refractive index≤170 nm), or from 110 nm to 160 nm (110 nm≤the thickness×the refractive index≤160 nm) or from 115 nm to 155 nm (115 nm≤the thickness×the refractive index≤155 nm), or from 120 nm to 140 nm (120 nm≤the thickness×the refractive index≤140 nm). An optical path length of the nth sublayer is approximately the product of the thickness and the refractive index of the nth sublayer. The refractive index of the nth sublayer of the anti-reflection layer 120 may be obtained, for instance, by applying an ellipsometer, which should however not be construed as a limitation in the disclosure. Note that the thicknesses of the sublayers of the anti-reflection layer 120, for instance, are obtained by calculating an average of three measurement points taken from a relative flat area. When the anti-reflection layer 120 does not have any flat area, the average is obtained by arbitrarily taking three measurement points.

The color shift phenomenon generated in the electronic device 10 may be measured, for instance, by using a spectrophotometer CM700d to irradiate the anti-reflection layer 120 disposed respectively on the flat area and the inflection area of the substrate 110 by a light beam having a wavelength of 550 nm, measuring coordinates L*, a*, and b* in the CIELAB color space, and applying the following color difference calculation equation to calculate the color difference, where ΔE is the color difference value generated between the flat area and the inflection area of the substrate 110, ΔL* is the brightness difference between the flat area and the inflection area of the substrate 110, Δa* is the red-green chromaticity difference between the flat area and the inflection area of the substrate 110 (a*>0 represents red, and a*<0 represents green), and Δb* is the blue-yellow chromaticity difference between the flat area and the inflection area of the substrate 110 (b*>0 represents yellow, and b*<0 represents blue). In addition, in this embodiment, ΔE=1 is defined as the just noticeable difference (JND), where ΔE<1 is marked as ○, indicating that the user cannot perceive the color shift phenomenon generated in the electronic device 10; 1≤ΔE<2 is marked as Δ, indicating that the user needs to carefully observe to perceive the color shift phenomenon generated in the electronic device 10; ΔE≥2 is marked as X, indicating that the user may easily perceive the color shift phenomenon generated in the electronic device 10.

$$\text{Color difference calculation equation: } \Delta E = \sqrt{\Delta L^{*2} + \Delta a^{*2} + \Delta b^{*2}}$$

As shown in FIG. 2, when the anti-reflection layer 120 includes 6~12 sublayers (n=6~12), the product range of the thickness and the refractive index of the nth sublayer of the anti-reflection layer 120 is set to range from 100 nm to 170 nm, so that it is rather difficult for users to observe the color shift phenomena in electronic devices (such as the electronic device 10 provided in this embodiment). In addition, as shown in FIG. 2, when the anti-reflection layer 120 includes 1-5 sublayers (n=1-5), for instance, n sublayers (n=4), the product range of the thickness and the refractive index of the nth sublayer of the anti-reflection layer 120 is set to range from 120 nm to 140 nm, so that it is rather difficult for the users to observe the color shift phenomena in the electronic devices. As can be seen from the above, when the number of the sublayers of the anti-reflection layer 120 increases, the acceptable product range of the thickness and the refractive index of the nth sublayer increases, and when the number of the sublayers of the anti-reflection layer 120 increases, the possibility that the users observe the color shift phenomena is reduced.

FIG. 3 illustrates a thickness, a refractive index, and an optical path length of each sublayer (including the first sublayer to the sixth sublayer provided above) of the anti-reflection layer 120 in the electronic device 10 according to four embodiments of the disclosure. Since the thickness, the refractive index, and the optical path length of each of the sublayers are defined above, no further explanation is provided hereinafter, which should not be construed as a limitation in the disclosure. In these four embodiments, for instance, 1≤ΔE≤2 or ΔE<1 is applicable.

FIG. 4A to FIG. 4F are schematic cross-sectional views respectively illustrating a portion of the protective substrate 100 in the electronic device 10 according to six embodiments of the disclosure, where the thickness of the anti-reflection layer 120 in the inflection area is less than the thickness of the anti-reflection layer 120 in the flat area, for instance.

As indicated above, the substrate 110, for instance, has a flat area 110P and an inflection area 110C, such that the anti-reflection layer 120 formed on the substrate 110 through performing the PVD process (e.g., sputtering) is likely to have different thicknesses in the flat area 110P and the inflection area 110C. However, the PVD process (e.g., sputtering) should not be construed as a limitation in the disclosure. That is, a thickness Tp of an anti-reflection layer 120p on the flat area 110P may be different from a thickness Tc of an anti-reflection layer 120c on the inflection area 110C.

Figure 4C:
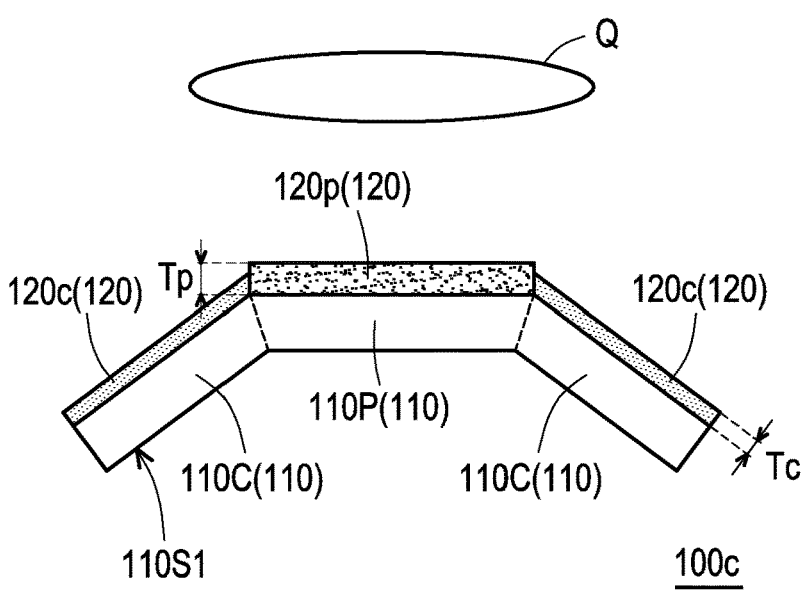
Figure 4D:
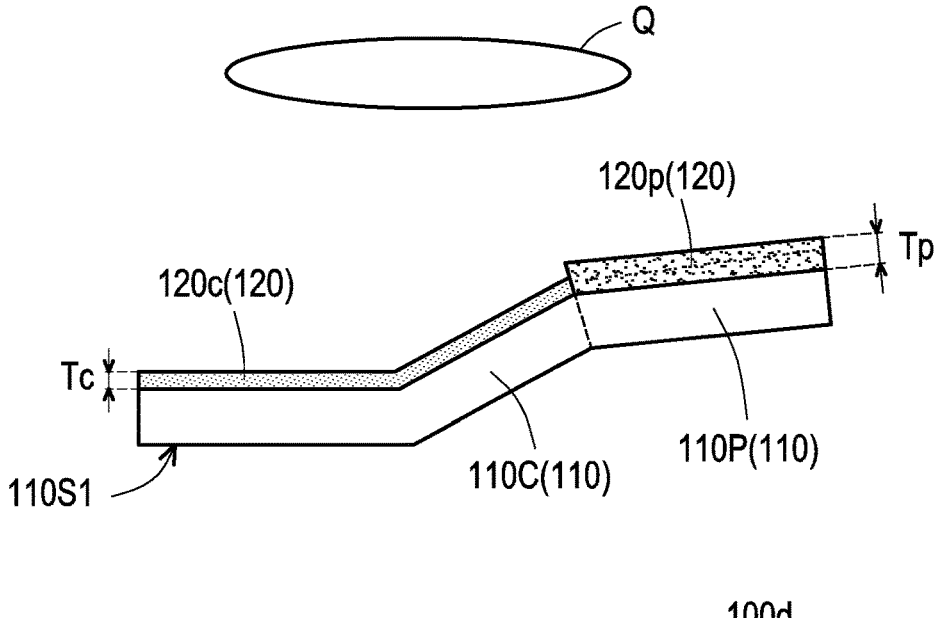

FIG. 4A to FIG. 4F respectively illustrate protective substrates 100a, 100b, 100c, 100d, 100e, and 100f in different embodiments, where the anti-reflection layer 120 is, for instance, disposed on a surface 110S1 of the substrate 110 that is away from and faces a target Q. Due to the special design of the substrate 110 (with a unique appearance), a distance from different areas of the substrate 110 to the target Q varies, which may lead to differences in the thickness of the anti-reflection layer 120 in different areas. As shown in FIG. 4A to FIG. 4D, the thickness Tc of the anti-reflection layer 120c on the inflection area 110C of the substrate 110 may be less than the thickness Tp of the anti-reflection layer 120p on the flat area 110P of the substrate 110, which should however not be construed as a limitation in the disclosure. In FIG. 4B to FIG. 4D, the inflection area 110C is farther away from the target Q compared to the flat area 110P.

Figure 4E:
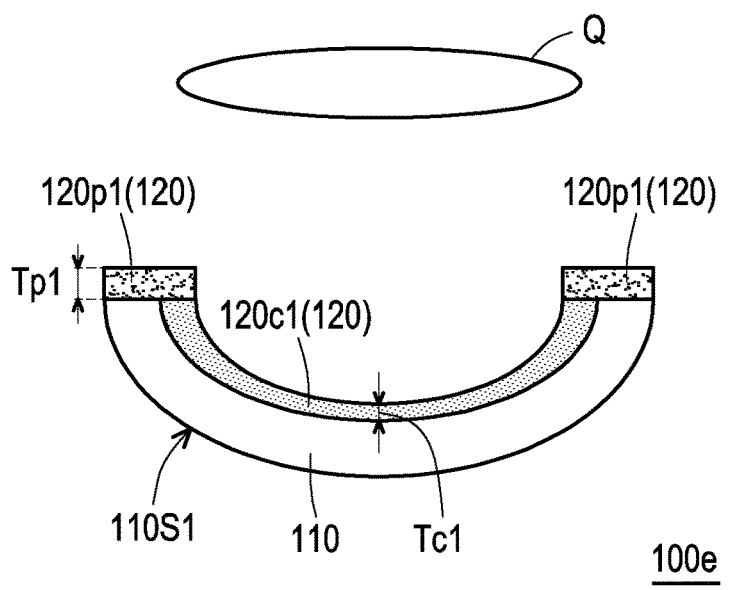

With reference to FIG. 4E, when the substrate 110 does not have a distinct flat area, e.g., when the surface of the substrate 110 appears to be of a curved shape, a thickness Tp1 of a portion 120p1 of the anti-reflection layer 120 close to the target Q is, for instance, greater than a thickness Tc1 of a portion 120c1 of the anti-reflection layer 120 located away from the target Q.

Figure 4F:
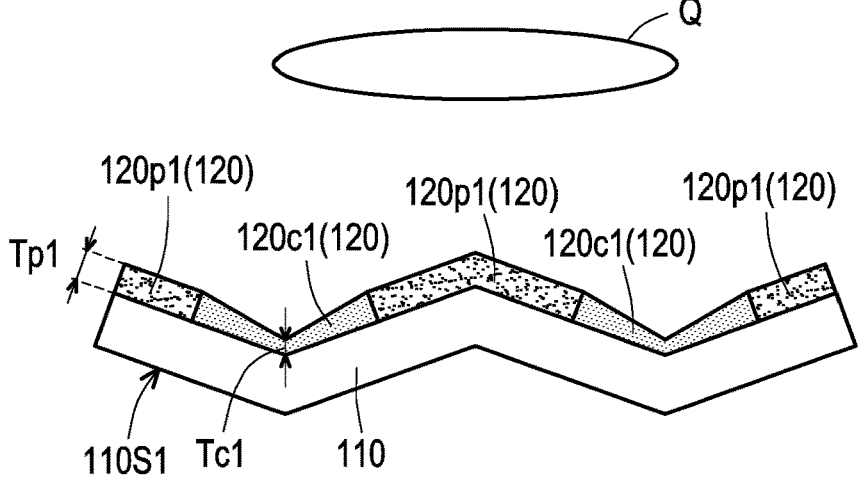

With reference to FIG. 4F, when the substrate 110 does not have a distinct flat area, e.g., when the surface of the substrate 110 appears to be of a wavy shape, the thickness Tp1 of the portion 120p1 of the anti-reflection layer 120 close to the target Q is, for instance, greater than the thickness Tc1 of the portion 120c1 of the anti-reflection layer 120 located away from the target Q.

FIG. 5 illustrates a relationship between a decrease range of the thickness of the anti-reflection layer in the electronic device respectively shown in FIG. 4A to FIG. 4F and the color shift phenomenon respectively generated in the electronic device.

In this embodiment, the color shift phenomenon generated in the electronic device 10 may be measured, for instance, by using the spectrophotometer CM700d to irradiate the anti-reflection layer 120 disposed respectively on the flat area 110P and the inflection area 110C of the substrate 110 by a light beam having a wavelength of 550 nm, measuring the coordinates L*, a*, and b* in the CIELAB color space, and applying the above color difference calculation equation to calculate the color difference, where the color difference calculation equation and the symbols ○, Δ, and X may be referred to as those provided in the previous embodiment and thus will not be further explained hereinafter. In addition, a decrease range of the thickness of the anti-reflection layer 120 in different areas may be, for instance, calculated according to the thickness Tc and the thickness Tp, where the thickness Tc is less than the thickness Tp, which should however not be construed as a limitation in the disclosure.

Thickness decrease range equation 1:

$$T_{reduce} = \frac{Tp - Tc}{Tp} \times 100\%$$

In the thickness decrease range equation 1, $T_{reduce}$ represents the decrease range of the thickness of the anti-reflection layer 120, Tp, for instance, represents the thickness of the anti-reflection layer 120p located on the flat area 110P, and Tc, for instance, represents the thickness of the anti-reflection layer 120c located on the inflection area 110C. Here, the thickness Tp may be calculated, for instance, by calculating the average of three measurement points taken from the flat area 110P, and the thickness Tc may be calculated, for instance, by calculating the average of three measurement points taken from the inflection area 110C, which should however not be construed as a limitation in the disclosure.

In some embodiments, when the substrate 110 does not have a flat area (i.e., similar to FIG. 4E or FIG. 4F), please refer to a thickness decrease range equation 2:

$$T_{reduce} = \frac{Tp1 - Tc1}{Tp1} \times 100\%$$

In the thickness decrease range equation 2, $T_{reduce}$ represents the decrease range of the thickness of the anti-reflection layer 120, Tp1, for instance, is the thickness of the anti-reflection layer 120p1 formed on the substrate 110 relatively close to the target Q during the sputtering process, and Tc1, for instance, is the thickness of the anti-reflection layer 120c1 formed on the substrate 110 relatively far from the target Q during the sputtering process. The thicknesses Tp1 and Tc1 may be respectively calculated by calculating the average of three measurement points respectively taken from the anti-reflection layers 120p1 and 120c1, for instance, which should however not be construed as a limitation in the disclosure.

Note that the thickness decrease range equation 1 is, for instance, applicable to situations where the substrate 110 has a distinct flat area 110P and a distinct inflection area 110C, while the thickness decrease range equation 2 is applicable to situations where the substrate 110 has an indistinct flat area 110P and an indistinct inflection area 110C or no inflection area 110C (as exemplarily shown in FIG. 4E or FIG. 4F).

As shown in FIG. 5, when the anti-reflection layer 120 includes 6~12 sublayers (n=6~12), and when the decrease range of the thickness of the anti-reflection layer 120 of the electronic device 10 is less than or equal to 7% ($T_{reduce}\leq7\%$), for instance, the color shift phenomenon is unlikely to be observed by the user; in the case where the decrease range of the thickness of the anti-reflection layer 120 of the electronic device 10 is greater than 7% and less than or equal to 13% ($7\%<T_{reduce}\leq13\%$), for instance, the color shift phenomenon may not be easily observed by the user.

Besides, as shown in FIG. 5, when the anti-reflection layer 120 of the electronic device includes 1~5 sublayers (n=1~5), and when the decrease range of the thickness of the anti-reflection layer 120 is less than or equal to 2% ($T_{reduce}\leq2\%$), for instance, the color shift phenomenon is unlikely to be observed by the user; in the case where the decrease range of the thickness of the anti-reflection layer 120 of the electronic device 10 is greater than 2% and less than or equal to 5% ($2\%<T_{reduce}\leq5\%$), for instance, the color shift phenomenon may not be easily observed by the user. In other words, when the anti-reflection layer 120 is designed to have more sublayers (e.g., 6~12 sublayers), the acceptable decrease range ($T_{reduce}$) of the thickness of the anti-reflection layer 120 is greater, and the possibility that the user observes the color shift phenomenon may be reduced.

FIG. 6A to FIG. 6E are schematic cross-sectional views respectively illustrating a portion of a protective substrate in an electronic device according to five embodiments of the disclosure, where the thickness of the anti-reflection layer 120 in the inflection area is greater than the thickness of the anti-reflection layer in the flat area, for instance.

As indicated above, the substrate 110 has the flat area 110P and the inflection area 110C, such that the anti-reflection layer 120 formed on the substrate 110 through performing the PVD process (e.g., sputtering) is likely to have different thicknesses in the flat area 110P and the inflection area 110C, respectively.

FIG. 6A to FIG. 6E respectively illustrate protective substrates 100a', 100b', 100c', 100d', and 100e' in different embodiments, where the anti-reflection layer 120 is, for instance, disposed on the surface 110S1 of the substrate 110 that is away from and faces the target Q. Due to the special design of the substrate 110 (with a unique appearance), a distance from different areas of the substrate 110 to the target Q varies, which may lead to differences in the thickness of the anti-reflection layer 120 in different areas.

Figure 6A:
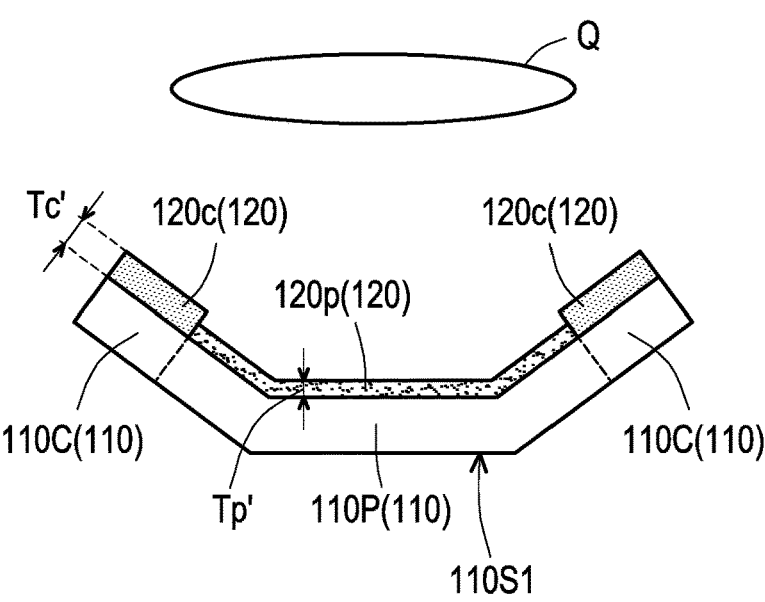
FIG. 6A to FIG. 6E are schematic cross-sectional views respectively illustrating a portion of a protective substrate in an electronic device according to five embodiments of the disclosure, where a thickness of an anti-reflection layer in an inflection area is greater than a thickness of the anti-reflection layer in a flat area.
Figure 6B:
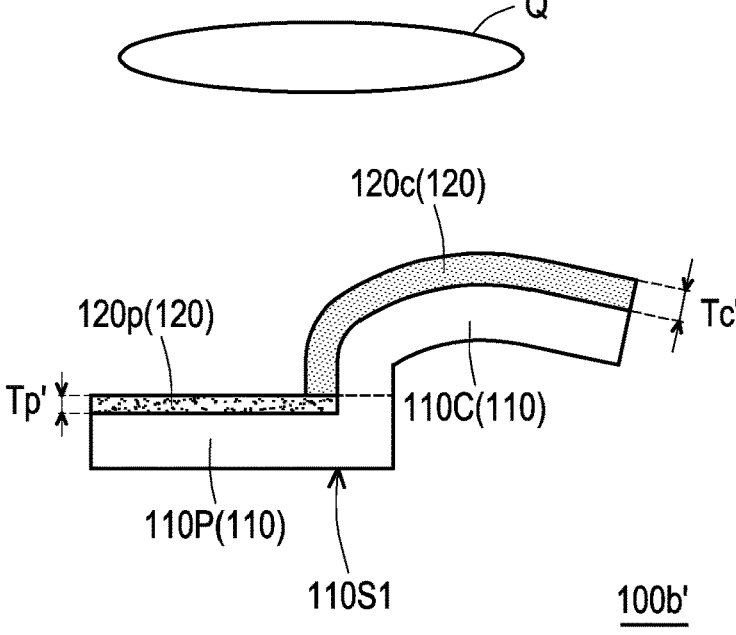
Figure 6C:
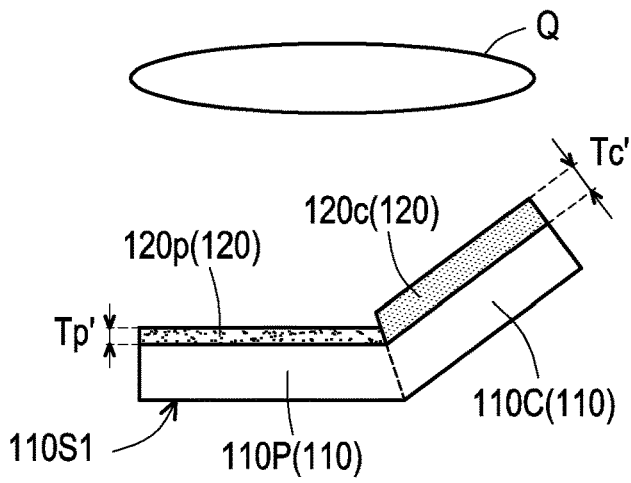

As shown in FIG. 6A to FIG. 6C, a thickness Tc' of the anti-reflection layer 120c on the inflection area 110C may be greater than a thickness Tp' of the anti-reflection layer 120p on the flat area 110P, for instance, which should however not be construed as a limitation in the disclosure. In FIG. 6A to FIG. 6C, the inflection area 110C, as compared to the flat area 110P, is closer to the target Q.

Figure 6D:
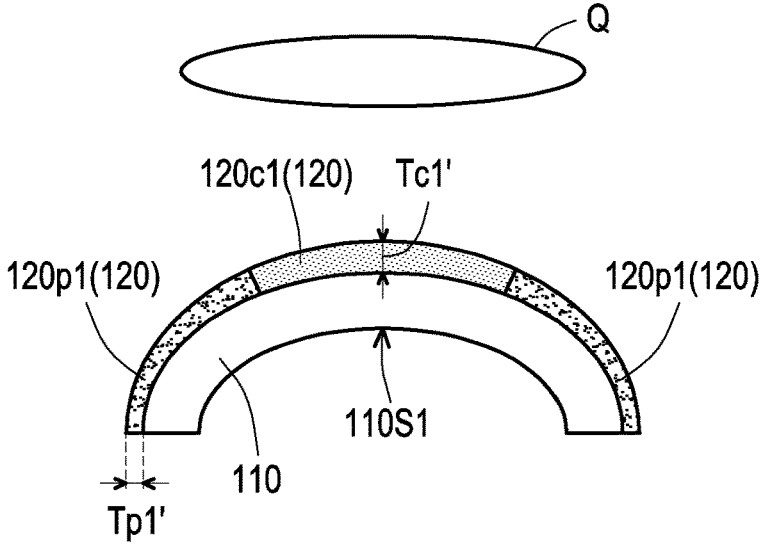

As shown in FIG. 6D, when the substrate 110 does not have a distinct flat area, e.g., when the surface of the substrate 110 appears to be of a curved shape, a thickness Tc1' of a portion 120c1 of the anti-reflection layer 120 close to the target Q is, for instance, greater than a thickness Tp1' of a portion 120p1 of the anti-reflection layer 120 located away from the target Q.

Figure 6E:
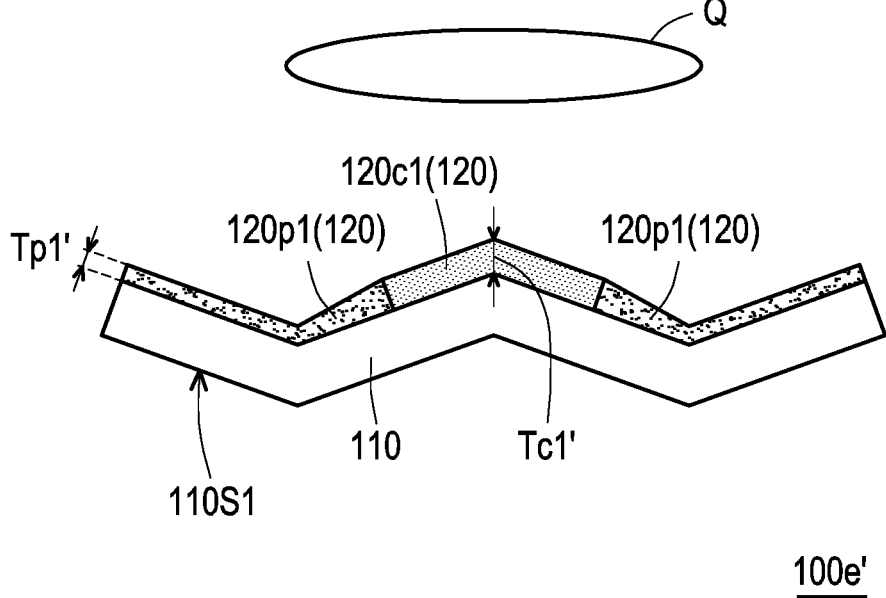

As shown in FIG. 6E, when the substrate 110 does not have a distinct flat area, e.g., when the surface of the substrate 110 appears to be of a wavy shape, the thickness Tc1' of the portion 120c1 of the anti-reflection layer 120 close to the target Q is, for instance, greater than the thickness Tp1 of the portion 120p1 of the anti-reflection layer 120 located away from the target Q.

FIG. 7 illustrates a relationship between an increase range of the thickness of the anti-reflection layer in the electronic device respectively shown in FIG. 6A to FIG. 6E and the color shift phenomenon respectively generated in the electronic device.

In this embodiment, the color shift phenomenon generated in the electronic device 10 may be measured, for instance, by using the spectrophotometer CM700d to irradiate the anti-reflection layer 120 disposed respectively on the flat area 110P and the inflection area 110C of the substrate 110 by a light beam having a wavelength of 550 nm, measuring the coordinates L*, a*, and b* in the CIELAB color space, and applying the above color difference calculation equation to calculate the color difference, where the color difference calculation equation and the symbols ◯, Δ, and X may be referred to as those provided in the previous embodiment and thus will not be further explained hereinafter. In addition, an increase range of the thickness of the anti-reflection layer 120 in different areas may be, for instance, calculated according to the thickness Tc' and the thickness Tp', where the thickness Tc' is greater than the thickness Tp', which should however not be construed as a limitation in the disclosure.

Thickness increase range equation 1:

$$T_{increase} = \frac{Tc' - Tp'}{Tp'} \times 100\%$$

In the thickness increase range equation 1, $T_{increase}$ represents the increase range of the thickness of the anti-reflection layer 120, Tc' represents the thickness of the anti-reflection layer 120c located on the inflection area 110C, and Tp' represents the thickness of the anti-reflection layer 120p located on the flat area 110P. Here, the thickness Tc' may be calculated, for instance, by calculating the average of three measurement points taken from the inflection area 110C, and the thickness Tp' may be calculated, for instance, by calculating the average of three measurement points taken from the flat area 110P, which should however not be construed as a limitation in the disclosure.

In some embodiments, when the substrate 110 does not have a flat area (i.e., similar to FIG. 6D or FIG. 6F), please refer to a thickness increase range equation 2:

$$T_{increase} = \frac{Tc1' - Tp1'}{Tc1'} \times 100\%$$

In the thickness increase range equation 2, $T_{increase}$ is the increase range of the thickness of the anti-reflection layer 120, Tc1' is the thickness of the anti-reflection layer 120c1 located on the substrate 110 closer to the target during the sputtering process, and Tp1' is the thickness of the anti-reflection layer 120p1 located on the substrate 110 farther away from the target during the sputtering process. The thicknesses Tc1' and Tp1' may be respectively calculated by calculating the average of three measurement points respectively taken from the anti-reflection layers 120c1 and 120p1, for instance, which should however not be construed as a limitation in the disclosure (as shown in FIG. 6D and 6E).

Note that the thickness increase range equation 1 is, for instance, applicable to situations where the substrate 110 has a distinct flat are 110P and a distinct inflection area 110C, while the thickness increase range equation 2 is applicable to situations where the substrate 110 has an indistinct flat area 110P and an indistinct inflection area 110C or no inflection areas 110C.

As shown in FIG. 7, when the anti-reflection layer 120 includes 6~12 sublayers (n=6~12), and when the thickness increase range of the anti-reflection layer 120 of the electronic device 10 is less than or equal to 6% ($T_{increase} \leq 6\%$), for instance, the color shift phenomenon is unlikely to be observed by the user; in the case where the thickness increase range of the anti-reflection layer 120 of the electronic device 10 is greater than 6% and less than or equal to 7% ($6\% < T_{increase} \leq 7\%$), the color shift phenomenon may not be easily observed by the user.

Besides, as shown in FIG. 7, when the anti-reflection layer 120 includes 1~5 sublayers (n=1~5), and when the increase range of the total thickness of the anti-reflection layer 120 of the electronic device is less than or equal to 2% ($T_{increase} \leq 2\%$), for instance, the color shift phenomenon is unlikely to be observed by the user; in the case where the increase range of the total thickness of the anti-reflection layer 120 of the electronic device is greater than 2% and less than or equal to 4% ($2\% < T_{increase} \leq 4\%$), for instance, the color shift phenomenon may not be easily observed by the user. In other words, when the anti-reflection layer 120 is designed to have more sublayers (e.g., 6~12 sublayers), the acceptable increase range ($T_{increase}$) of the thickness of the anti-reflection layer 120 is greater, and the possibility that the user observes the color shift phenomenon may be reduced.

To sum up, by setting the optical path length (the product of the thickness and the refractive index of the nth sublayer) of the nth sublayer (the sublayer farthest away from the substrate or the sublayer which the ambient light enters first) of the anti-reflection layer of the electronic device provided in one or more embodiments of the disclosure to range from 100 nm to 170 nm, the color shift phenomenon in the electronic device provided in one or more embodiments may not be easily observed by the user.

Although the embodiments of the disclosure and the advantages thereof have been disclosed above, it should be understood that any person skilled in the art can make changes, substitutions, and modifications without departing from the spirit and scope of the disclosure, and the features of the embodiments can be arbitrarily mixed and replaced to form other new embodiments. In addition, the protection scope of the disclosure is not limited to the process, machine, manufacture, material composition, device, method, and steps in the specific embodiments described in the specification. Any person skilled in the art can understand conventional or future-developed processes, machines, manufactures, material compositions, devices, methods, and steps from the content of the disclosure as long as the same can implement substantially the same functions or achieve substantially the same results in the embodiments described herein. Therefore, the protection scope of the disclosure includes the above processes, machines, manufactures, material compositions, devices, methods, and steps. In addition, each claim constitutes a separate embodiment, and the protection scope of the disclosure further includes combinations of the claims and the embodiments. The protection scope of the disclosure should be defined by the appended claims.

What is claimed is:

1. An electronic device, comprising:
   a protective substrate, comprising:
      a substrate; and
      an anti-reflection layer, disposed on the substrate, wherein the anti-reflection layer comprises a first sublayer to an nth sublayer sequentially arranged on the substrate, n is greater than 1, and a product range of a thickness and a refractive index of the nth sublayer ranges from 100 nm to 170 nm,
   wherein the substrate has a flat area and an inflection area, and a thickness of the anti-reflection layer on the flat area is greater than a thickness of the anti-reflection layer on the inflection area,
   wherein a decrease range of the thickness of the anti-reflection layer is defined by a following equation:

15                                              16

$$\frac{Tp - Tc}{Tp} \times 100\% \leq 7\%$$

wherein Tp is the thickness of the anti-reflection layer on the flat area, and Tc is the thickness of the anti-reflection layer on the inflection area.

2. The electronic device according to claim 1, wherein the thickness of the nth sublayer ranges from 70 nm to 120 nm.

3. The electronic device according to claim 1, wherein n is an even number, and the first sublayer to the nth sublayer are sequentially stacked high-reflective-index sublayers and low-reflective-index sublayers.

4. The electronic device according to claim 3, wherein n is greater than or equal to 4, a sum of a thickness of the first sublayer and a thickness of the second sublayer is defined as a first total thickness, a sum of a thickness of the (n−1)th sublayer and the thickness of the nth sublayer is defined as a second total thickness, and the first total thickness is less than the second total thickness.

5. The electronic device according to claim 4, wherein a difference between the second total thickness and the first total thickness ranges from 20 nm to 220 nm.

6. The electronic device according to claim 4, wherein when n is greater than or equal to 6, a sum of a thickness of the third sublayer and a thickness of the fourth sublayer is defined as a third total thickness, and the third total thickness is greater than the first total thickness.

7. The electronic device according to claim 6, wherein a difference between the third total thickness and the first total thickness ranges from 20 nm to 220 nm.

8. The electronic device according to claim 4, wherein when n is greater than or equal to 6, a sum of a thickness of the third sublayer and a thickness of the fourth sublayer is defined as a third total thickness, and the third total thickness is less than the second total thickness.

9. The electronic device according to claim 1, wherein the decrease range of the thickness of the anti-reflection layer is defined by a following equation:

$$\frac{Tp - Tc}{Tp} \times 100\% \leq 2\%$$

10. The electronic device according to claim 1, wherein the product range of the thickness and the refractive index of the nth sublayer ranges from 120 nm to 140 nm.

\*    \*    \*    \*    \*